high speed and is readily distinguishable from the clutter or windblown foliage in which the beacon is placed. This beacon includes a generally spherical body of dielectric material permeable to the electromagnetic radiation transmitted by the radar. This body may be a helisphere or a Luneburg lens or a reflecting hemisphere for vertical radiation. Where the body is a helisphere electrical conductors are spaced along the surface of the body at distances less than one-half wavelength of the radiation, each at an angle of about 45° to the diametral plane of the body along the transmitted beam from the radar or to the so-called plane of omnidirectional coverage of the body. In the case of a Luneburg lens or a reflecting hemisphere the conductors may be in the plane of polarization of the radiation of the radar. Diodes are connected in the conductors at spacings along the conductors of less than one-half wavelength of the radiation. The diodes are rendered alternately conducting and non-conducting at about the range-gating repetition frequency of the radar. When the diodes are conducting, the conductors reflect the incident radiation and when the diodes are non-conducting the incident radiation is transmitted thru the body. The retrodirective reflector apparatus also includes a reflector spaced from the conductors about one-quarter wavelength of the radiation which reflects the radiation transmitted by the body. This latter reflected radiation is displaced in phase by about one-half wavelength of the radiation transmitted by the radar with respect to the radiation directly reflected by the conductors. The pairs of reflected signals thus reflected to the radar give the effect of a target moving at a very high speed. The beacon also includes a helisphere reflector or a Luneburg shpere for focussing the radiation from the radar on the conductors of the above-described reflector.

United States Patent [19]
Wheeler

[11] 3,896,440
[45] July 22, 1975

[54] RETRODIRECTIVE PASSIVE BEACON FOR SIMULATING A MOVING TARGET

[75] Inventor: Myron S. Wheeler, Baltimore, Md.

[73] Assignee: Westinghouse Electric Corporation, Pittsburgh, Pa.

[22] Filed: Nov. 26, 1971

[21] Appl. No.: 202,470

[52] U.S. Cl. ............ 343/18 D; 343/18 B; 343/18 E
[51] Int. Cl. ............................................. H04k 3/00
[58] Field of Search ..... 343/18 D, 18 B, 18 E, 17.7, 343/911 L

[56] References Cited
UNITED STATES PATENTS

| | | | |
|---|---|---|---|
| 3,108,275 | 10/1963 | Chisholm | 343/18 D |
| 3,206,749 | 9/1965 | Chatelain | 343/18 B |
| 3,331,070 | 7/1967 | Sommers et al. | 343/17.7 |
| 3,417,398 | 12/1968 | Lewis et al. | 343/18 D |
| 3,623,091 | 11/1971 | Mayo, Jr. et al. | 343/18 D |

OTHER PUBLICATIONS
J. Croney and W. D. Delany, "A New Type of Omni--Azimuthal Radio-Echo Enhancer," The Microwave Journal, March 1963, pp. 105-109.

Primary Examiner—Maynard R. Wilbur
Assistant Examiner—G. E. Montone
Attorney, Agent, or Firm—D. Schron

[57] ABSTRACT
There is disclosed a retrodirective passive beacon for use with MTI radar (moving-target-indicator radar) for mapping in heavy clutter or foliage and the like. The signal which this beacon reflects back to the radar simulates a signal from a target moving at a high speed 17 Claims, 15 Drawing Figures

RETRODIRECTIVE PASSIVE BEACON FOR SIMULATING A MOVING TARGET

CROSS-REFERENCE TO RELATED DOCUMENTS

The following documents are incorporated herein by reference: A. E. Schrank and R. P. Grove, "The Helisphere Passive Beacon," 16th USAF Antenna Symposium, Monticello, Ill., October 1966., Microwave Scanning Antennas, Vol. 1 — Hansan Academic Press, Page 214 for Luneburg Lens — page 221 for Helisphere Antennas.

BACKGROUND OF THE INVENTION

This invention relates to communication and has particular relationship to passive retrodirectional reflector signalling apparatus, analogous to corner reflectors, which serve as beacons or the like in lieu of active powered transponders. The helisphere antenna may serve as such a passive reflector. The helisphere antenna includes a generally spherical shell of dielectric material which may be regarded as having a diametral plane of omnidirectional coverage along the beam, usually along the center of the beam, of the radiation to be reflected or retrodirected. This shell has imprinted thereon or secured thereto a grating of electrical conductors spaced less than one-half wavelength of the radiation to be reflected and each at an angle of 45° to the diametral plane. A second like spherical shell of dielectric material with electrical conductors is disposed with its conductors in the focal sphere of the first shell and its conductors parallel to the conductors of the first sphere. The two shells cooperate to reflect the incident radiation back to the source or radar from which it is transmitted when the reflected radiation may be processed.

Typical of the purposes of beacons is a demand for their use in mapping. In this use the beacons serve as points emitting reflected or retransmitted radiation in the area to be mapped. Where there is heavy clutter or heavy foliage in the area it is desirable that the beacons operate in conjunction with a MTI radar to depress the relative magnitude of the clutter return.

In accordance with the teachings of the prior art transponder beacons can be used for mapping. However, usually adequate battery power is not available to permit the use of transponders or, for the number of transponders demanded, is not economical. Helisphere antennas could also be used as beacons for this mapping purpose. But where the clutter is heavy or there is heavy foliage, which may be wind blown, the signals derived from such antennas are so weak relative to the clutter as not to be readily and reliably detectable.

It is an object of this invention to overcome the above-described disadvantages of the prior art and to provide a passive beacon which shall conserve a minimum of battery power in its operation and shall produce strong reflected signals that shall be readily and reliably detectable.

SUMMARY OF THE INVENTION

This invention arises from the discovery that highly reliable reflected signals, detectable through heavy clutter and foliage, can be produced from a passive stationary beacon which reflects a signal simulating the signal reflected from a target moving at a high speed. The beacon produces phase modulation of the incident radiation which renders the radiation emitted by the beacon readily and reliably distinguishable from the clutter and foliage. To achieve this object the beacon surface, from which the impinging or incident radiation is derived from an MTI radar, is reflected or position-modulated from pulse to pulse by about a quarter wavelength of the radiation transmitted by the radar. The receiver of the MTI radar, whether the radar is coherent or non-coherent, on receiving the radiation reflected by the beacon interprets the received radiation as reflected by a target moving at maximum velocity. While apparent maximum velocity is achieved by position-modulation of one-quarter wavelength, position-modulation of other magnitudes, for example, between a small fraction of half wavelength of the radiation transmitted by the radar, to achieve lower simulated target velocities are within the scope of this invention.

In accordance with this invention there is provided signalling apparatus including an MTI radar having means for transmitting a beam of radiation and receiving means for receiving and processing the radiation received from targets and a passive, stationary, beacon capable of producing radiation simulating that reflected from a moving target. The beacon includes a helisphere having a generally spherical body of a dielectric material permeable to the radiation from the radar. This body has on its surface a grating of electrical conductors spaced less than one-half wavelength of the radiation and is disposed so that these conductors are at about 45° to the plane of its omnidirectional coverage. The beacon also includes a second inner and concentric body of generally spherical form and of dielectric material permeable to the radiation with a grating of electrical conductors spaced less than one-half wavelength of the radiation. Diodes are interposed in the latter electrical conductors. The second body is disposed so that its plane of omnidirectional coverage is coincident with the plane of omnidirectional coverage of the first body and with its conductors at about 45° to this latter plane and in the focal sphere of the conductors on the first body. The conductors of the second body are then parallel to the conductors of the first body. About one-quarter wavelength inwardly from its conductors with respect to the first body, there is a reflector of the radiation.

The diodes interposed in the conductors of the second body are alternately rendered conducting and nonconducting at approximately the repetition rate of the radar. To achieve this purpose the radiation incident on the beacon may be detected and amplified and trigger a diode switching potential or, more simple, the diodes may be switched non-synchronously at approximately the repetition rate of the radar. In either event the power demanded from a battery included in the beacon is low.

The component of the electric field vector, E, of radiation incident on the outer body, which is perpendicular to the conductors, passes through the outer body and is incident on the conductors at the rear of the outer body. The conductors on the outer body respectively displaced by 180° in azimuth from the conductors on the outer body on which the radiation is incident are respectively at 90° to the latter conductors; that is, to the conductors on the outer body on which the radiation is first incident. The incident radiation which passes through the outer body has an electric field vector E along the conductors at the rear which are respectively at right angles to the conductors on which the radiation is first incident. The incident radiation which passes through the outer body is reflected from the inner surface of the outer body and focussed on the conductors on the inner body along the focal surface, which is generally spherical, of the inner body. Since these conductors are generally parallel to the focussing conductor, this focussed radiation is reflected back to the focussing conductors and retransmitted back to the radar during the intervals when the conductors on the inner body are capable of conducting; that is, during the intervals where the diodes are conducting. During the intervening intervals, the focussed radiation is transmitted through the inner body and reflected from the reflecting surface displaced from the conductor in the inner body. This later reflected radiation simulates reflection from a target which is moved at a speed such as to produce a phase change of one-quarter wavelength in the radiation incident on it. The receiver of the radar which receives the returned radiation interprets this radiation as a signal from a body moving at a very high speed.

It is desirable that the surface area of the rear conductors of the inner body first presented to the radiation passing through the outer body should be relatively small compared to the area of the wavefront passing through so that the radiation passing through the outer body is, with relatively low energy loss, returned to the radar. Typically where the MTI radar and the beacon are disposed so as to process azimuthal signals and the outer body is spherical, the inner body has a diameter equal to about half of the diameter of the outer body. Since the radiation reflected from the outer body is focussed, an inner body of smaller area produces a strong signal.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which.

DETAILED DESCRIPTION OF EMBODIMENTS

Figure 1:
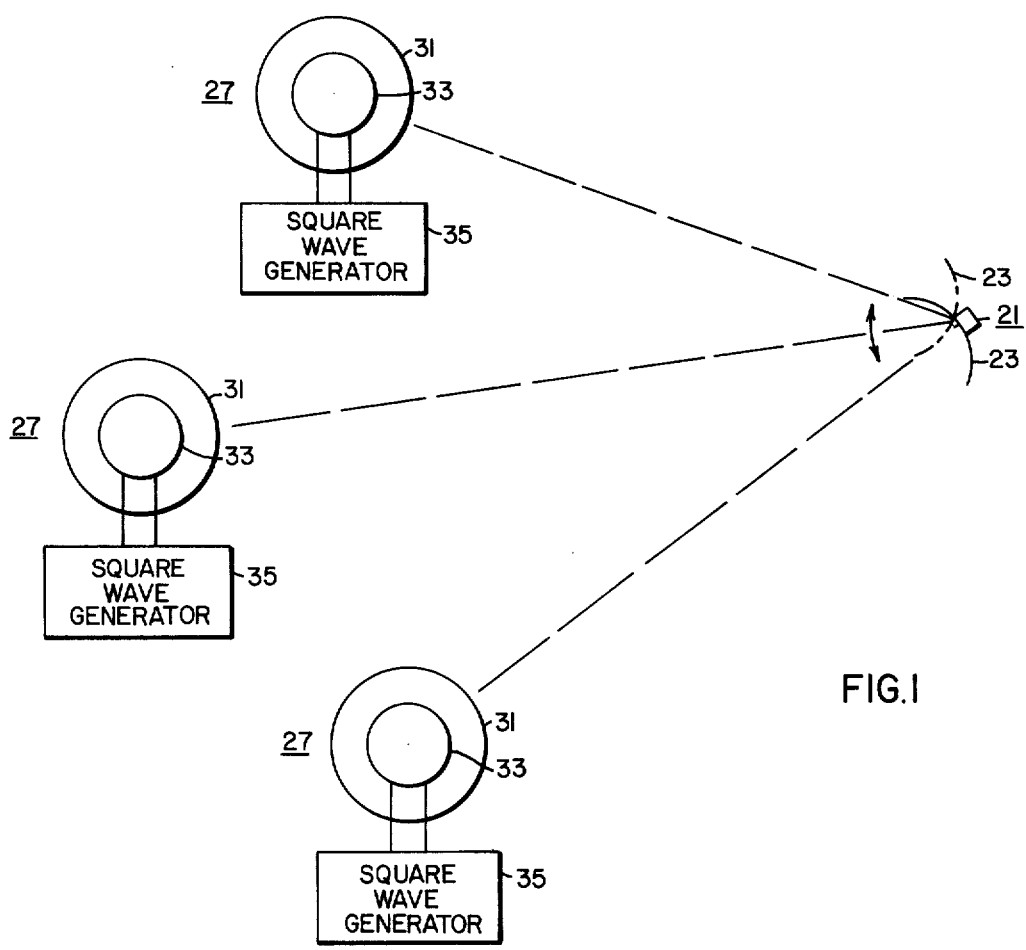
FIG. 1 is a diagrammatic view showing a mapping system which embodies this invention.

The apparatus shown in FIG. 1 typifies a mapping system and includes an MTI radar 21 having a common antenna 23 for transmitting and receiving. The antenna 23 may be set to cover different solid angles both in azimuth and in elevation. The radar 21 is conventional including a transmitter (not shown) for transmitting electromagnetic radiation and a receiver (not shown) for receiving and processing resulting radiation reflected from targets. The receiver includes the usual range gates for gating the received signal so that the signals received from targets at different ranges are separated in accordance with their ranges. The transmitted radiation is in the form of pulses 25 (FIG. 7b) transmitted at a predetermined pulse-repetition rate.

The apparatus shown in FIG. 1 also includes a plurality of passive stationary beacons 27 which are distributed about the area to be mapped. Each beacon 27 serves as a discrete point source of radiation when enabled by incident radiation transmitted from the radar 21. Each beacon includes an outer body 31, in the form of a helisphere and an inner body 33 in the form of a helisphere reflector unique to this invention. In addition there is a low-power square-wave generator 35 for impressing a square-wave potential on the conductors 37 of the inner body.

Figure 2:
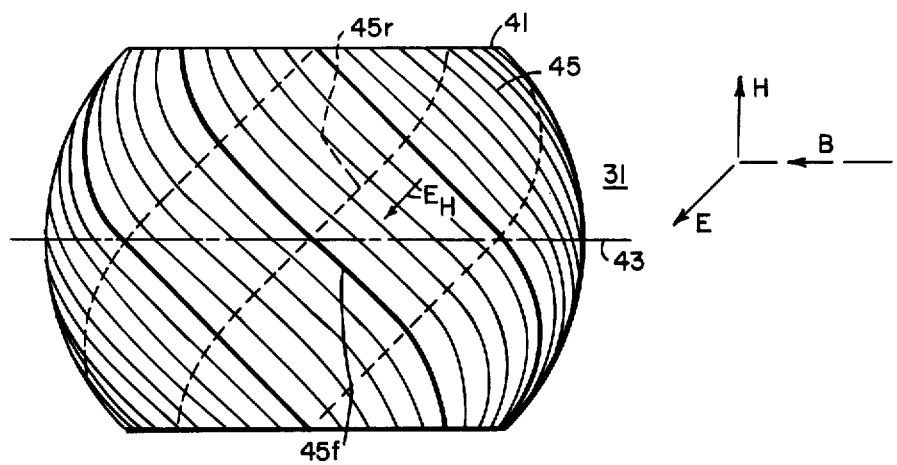
FIG. 2 is a view in side elevation of a helisphere radiation reflector used in the practice of this invention which is included for the purpose of explaining this invention.

The outer body 31 (FIGS. 2 and 4) is a segment or section of a shell 41 of dielectric material permeable to the radiation from the radar. The shell 41 may be regarded as cut by a central plane 43 parallel to the radar beacon incident on it. The plane 43 is the plane of the omnidirectional coverage of the body 31. On the outer surface of the body 31 there is imprinted, impressed or otherwise disposed a grating of electrical conductors 45 which are oriented at 45° to the plane 43. Corresponding to each conductor 45f on which the radiation is incident there is a conductor 45r on the rear of body 31, 180° in azimuth from the conductor 45f, which is at right angles to conductor 45f. The conductors 45 are spaced less than one-half wavelength of the radiation from the radar 21.

Figure 3:
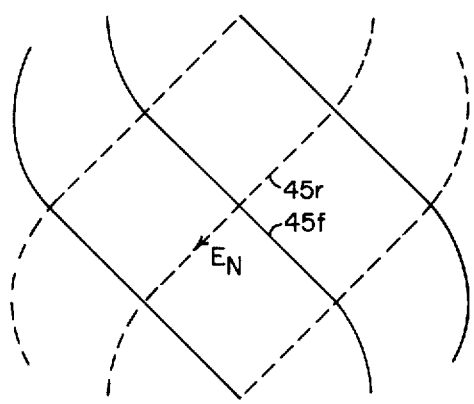
FIG. 3 is a diagrammatic view showing the relationship of certain of the conductors on a helisphere reflector.

The radiation, represented by the arrow B (FIG. 2), is plane polarized and in this case representing horizontally polarized, has an electric field vector E and a magnetic field vector H. When this radiation impinges in the conductors 45 the vector E may be regarded as resolved into a component $E_n$ perpendicular to the incident conductors 45f and a vector along the conductors 45f. The radiation corresponding to the latter vector is reflected or dispersed outwardly as by the conductors 45 and constitutes a loss of energy. The radiation corresponding to the vector $E_n$ is passed through the body 31 to the rear of the body. The vector $E_n$ is in the region along the conductors 45r and the corresponding radiation is reflected back focussed on the focal sphere of the body 31 (FIG. 3).

Figure 5:
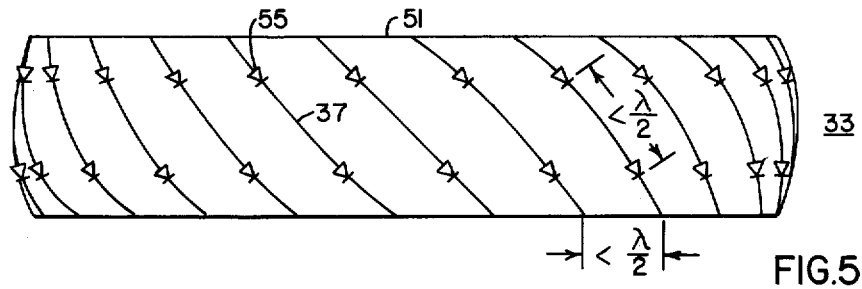
FIG. 5 is a view in side elevation of the inner body of a beacon in accordance with this invention.
Figure 6:
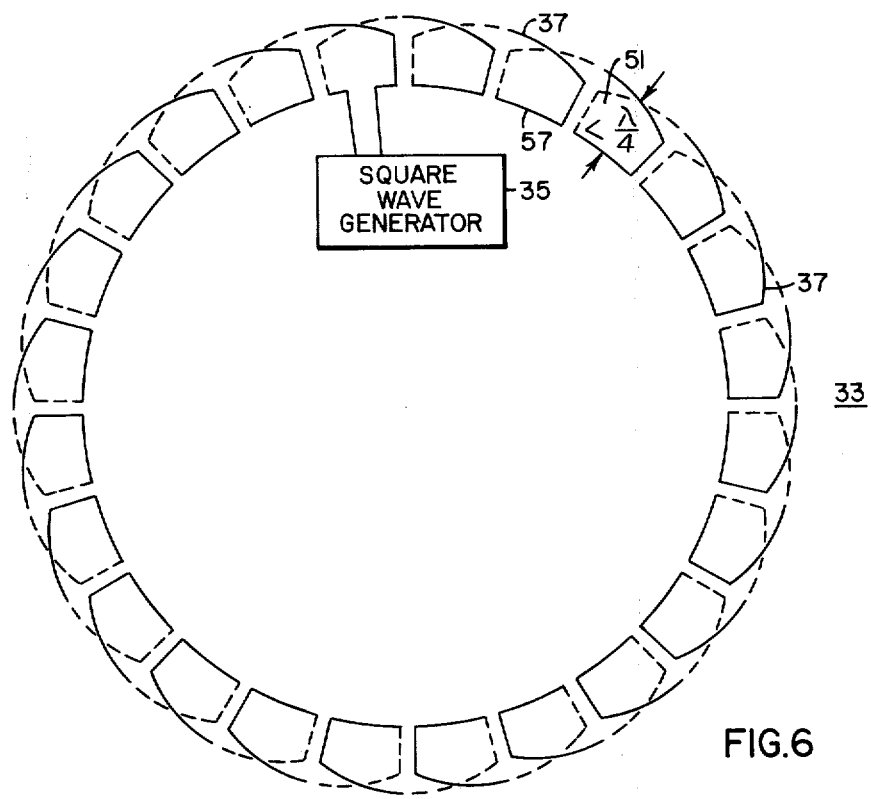
FIG. 6 is a plane view of the inner body shown in FIG. 5.

The body 33 (FIGS. 5 and 6) is a shell 51 of dielectric material permeable to the radiation. The shell 51 may be similar to the core of a torroid coil or transformer. The shell 51 is provided with an electrically conducting winding each turn of which is composed of the conductor 37 on the outer surface of the shell and a return conductor 57 on the inner part of the shell 51. The turns are spaced less than one-half wavelength of the radiation and the conductors 37 are a grating of conductors less than one-half wavelength of the radiation along the outer surface. On the outer surface diodes 55 are interposed in the conductors 37 at distances along the conductors of less than one-half wavelength of the transmitted radiation. The conductors 57 within the shell 51 do not include diodes and constitute a reflector for the radiation. The inner surface may also be metal clad at the inner conductors 57 to achieve more efficient reflection. The cladding is not shown. The conductors 57 are spaced about one-fourth wavelength from the conductor 37.

The diameter of shell 51 is such that the conductors 37 are in the focal sphere of the windings 45. In practice the shell 51 is about one-half the diameter of the shell 41. The body 33 is disposed within the body 31 so that its plane of omnidirectional coverage is in the plane of omnidirectional coverage of the body 31.

Figure 4:
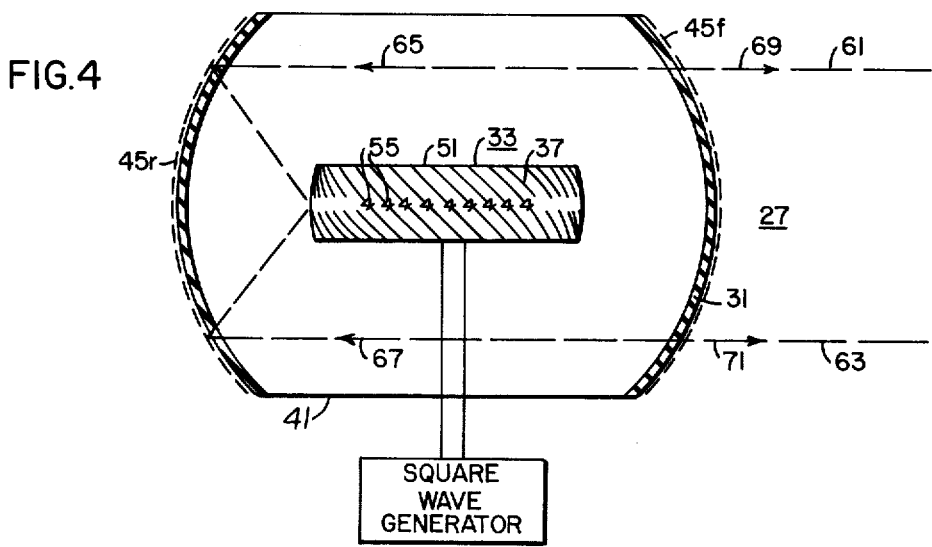
FIG. 4 is a view in side elevation with a portion of the outer body broken away showing a passive beacon in accordance with this invention.

The beam of radiation transmitted from the radar 21 is represented by the region between the broken lines 61 and 63 of FIG. 4. The portion of the beam 61–63 corresponding to the component of the electric-field vector perpendicular to the conductors on which the beam is incident passes through the shell 31 as indicated by the arrow heads 65, 67 on lines 61, 63, and is focussed by the conductors 45r on the conductors 37. So that a substantial portion of the transmitted energy is passed to the conductors 45r and focussed on conductors 37 the loss by reflection from the conductors 57 (FIG. 6) convexed towards the radiation passing through the outer body should be minimized. The height of the array of conductors 57 should be maintained at a minimum consistent with the elevation coverage required of the beacon; that is the coverage above and below the diametral plane. To the extent that the beam focussed on conductors 37 is reflected the beam is returned along the path along which it is transmitted as indicated by the arrow heads 69 and 71.

Figure 7:
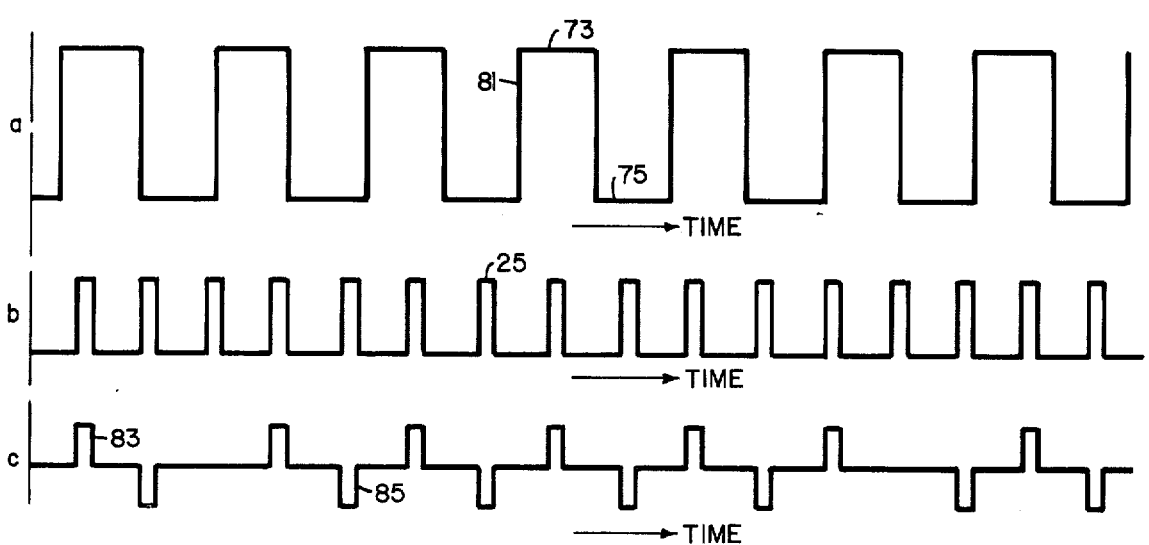
FIG. 7a, b and c are graphs having time axis identifying the same time lapse illustrating the operation of this invention.

The reflection of the beam 61–63 is controlled by switching the diodes 55 between conducting and non-conducting states. This switching is achieved by means of square-wave generator 35 which impresses a periodic square wave potential as shown in FIG. 7a on the diodes 55. The diodes 55 are connected in series by the conductors 37 and 57 and the potential of FIG. 7a is impressed on all diodes. Each period of square-wave potential includes voltage 73 and 75 of appropriate diode switching polarity shown above and below a time axis. When the potential 73 is impressed the diodes 55 are conducting; when the potential 75 is impressed the diodes 55 are non-conducting. Where the diodes 55 are conducting the conductors 37 reflect the focussed radiation; when the diodes 55 are non-conducting the focussed radiation passes thru the shell 51 and is reflected by the metallic reflectors which are spaced only one-fourth wavelength of the radiation from the conductors 37. Typically, the radiation is at a frequency of about 10,000 megacycles or wavelength of about 3 centimeters. The spacing between the conductors 37 and 57 is then about three-fourth cm. For this short spacing the beams reflected from conductors 37 and the inner surface are substantially merged.

The radiation from the radar is transmitted in pulses 25 (FIG. 7b) at intervals corresponding to the repetition rate. Typically, the pulses may have a duration of 1 microsecond and the interval between successive pulses may be 1000 microseconds. The pulses are not synchronized with the square-wave potential (73–75) and the duration of each square-wave loop (one-half period of the squarewaves) deviates from the repetition rate by a small magnitude of the order of 10 percent or 1 percent. The transmitted pulses then occur at different instants following the start of each square-wave pulse over a cycle of pulses depending on the deviation.

FIG. 7b shows the magnitude of the pulses 25 from the radar, incident on the conductors 37 and 57 or on the metal surface (not shown) if any is included respectively, as a function of time. Points along the same vertical line extending through FIGS. 7a, b and c correspond to the same instant of time. The half-period of the square-waves is, shown by way of example, about 10 percent greater than the interval between pulses and the pulses 25 are seen to occur at different instants represented by the vertical lines 81 after the transitions between positive voltage 73 and negative voltage 75.

The pulses 25 incident while diodes 55 are conducting (positive square-waves) are directly reflected from the conductors 37 and are returned to the radar in phase with the incident pulses. The pulses 25 incident while the diodes 55 are non-conducting are reflected by the inner wall and are returned to the radar delayed by one-half period of the frequency of the radiation or in opposite phase to the incident pulses. This is shown in FIG. 7c where the returned in-phase pulses are labelled 83 and the opposite-phase pulses 85. Pulses which occur at the instants of transition (81) are not returned because the signals reflected from conductors 37 and 57 counteract each other. The radar receiver interprets a pair of opposite-phase pulses 83 and 85 as received from a target moving at a very high speed and readily distinguishes this signal over heavy clutter or heavy wind-blown foliage.

Figure 8:
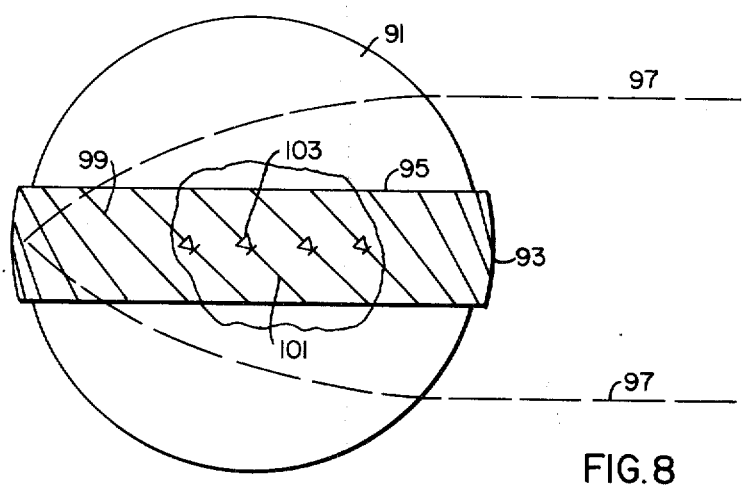
FIG. 8 is a view in side elevation showing a modification of this invention.
Figure 9:
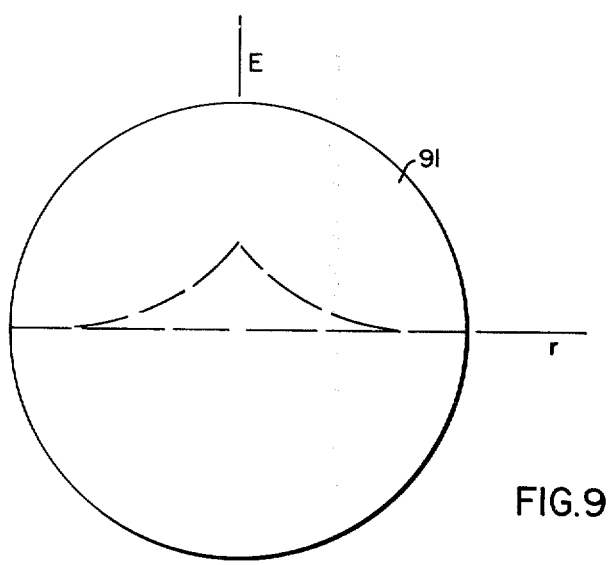
FIG. 9 is a diagrammatic view presented to serve in the explanation of the operation of the apparatus shown in FIG. 8.

The apparatus shown in FIGS. 8 and 9 is a passive beacon which, includes a Luneburg sphere 91 and a body 93 similar to the body 33 of FIG. 4. This beacon is capable of operating with different radars one producing vertically polarized radiation and another horizontally polarized radiation. The body 93 is a shell 95 of generally spherical form composed of a dielectric material permeable to the radiation from the radar. This radiation is represented as between the broken lines 97 of FIG. 8. The body 93 is disposed about the sphere 91 with its plane of omnidirectional coverage coincident with the plane of omnidirectional coverage of sphere 91. The body 93 has a grating of electrical conductors 99 spaced around the surface of the body, the spacing between successive conductors being less than one-half wavelength of the radiation. The conductors 99 are in the form of the outer conductors of turn of a coil, or transformer with return conductors 10 along the internal face of the body 93. Diodes 103 are interposed in the inner conductors 101 at spacings along the conductors of less than one-half wavelength of the radiation. The inner conductors and the outer conductors are spaced about one-quarter wavelength of the radiation.

The Luneburg sphere 91 is a sphere of dielectric material whose dielectric constant is graded from the center to the periphery as shown by the curve 105 of FIG. 9. The effect of this grading of the dielectric material is that the beam of radiation 97 is focussed on the conductors 101 at the rear of body 93. The conduction of the diodes is varied by a square-wave potential (source not shown) as shown in FIG. 7a and a signal is reflected from the beacon shown in FIG. 8 which simulates the reflection from a target moving at a high speed.

Because the conductors 101 are at an angle of 45° to the plane of omnidirectional radiation there is a loss of 6 db in the energy incident on the conductors for either vertically or horizontally polarized radiation. Where the radar produces either horizontally or vertically polarized radiation this loss of 6 db can be avoided with the apparatus shown in FIGS. 9A through 9D.

Figures 9A, 9B, 9C, 9D:
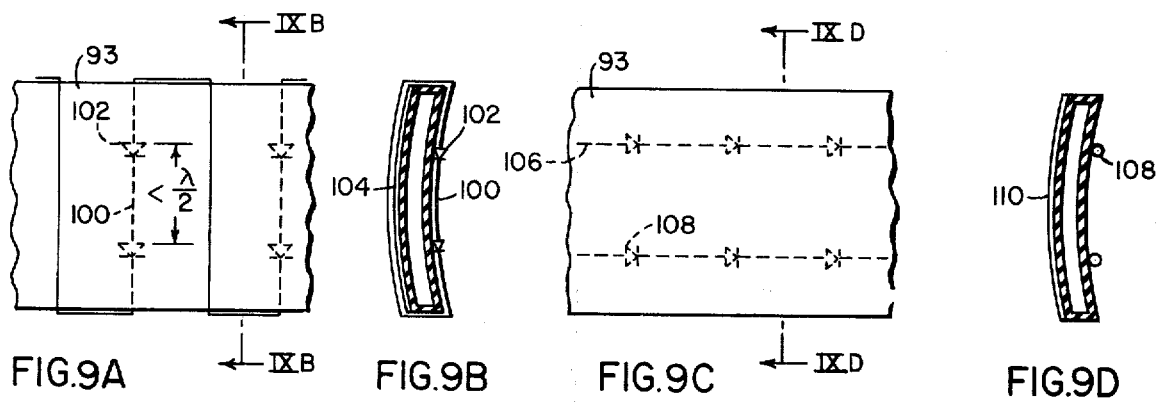
FIG. 9A is a fragmentary view showing a modification of the invention shown in FIG. 8.
FIG. 9B is a view in section taken along line IX-B—IXB of FIG. 9A.
FIG. 9C is a fragmentary view showing another modification of the invention shown in FIG. 8.
FIG. 9D is a view in section taken along line IX-D—IXD of FIG. 9C.

As shown in FIGS. 9A through 9D, the conductors on the body 93 on the surface of the sphere 91 may be aligned in the plane of polarization of the radiation from the radar. FIGS. 9A and 9B show such alignment of conductors 100 where the plane of polarization is vertical. These conductors 100 are spaced at distances less than one-half wavelength of the radiation along an equatorial belt of the sphere having a vertical extent capable of providing the elevational coverage demanded. Diodes 102 are interposed in the conductors 100 at spacings along the conductors of less than one-half wavelength of the radiation from the radar. The conductor 100 and diodes 102 are connected in series. For this purpose the connecting conductors may loop behind the surface defined by conductors 102. Metal cladding 104 may be provided to improve the efficiency of the reflection. This cladding 104 is spaced about one-quarter wavelength of the radiation behind the conductor 100 and diodes 102.

FIGS. 9C and 9D show a reflector for horizontally polarized incident radiation from a radar. In this case the conductors 106 extend horizontally around the equatorial belt of sphere 91 and are spaced less than one-half wavelength. Diodes 108 are interposed in the conductors 106 at intervals of less than one-half wavelength. The conductors 106 and diodes 108 are connected in series. Metal cladding 110 is provided at a distance of less than one-quarter wavelength behind conductors 106 and diodes 108.

The diodes 102 or 108 are switched on and off in the same manner as the diodes of the other embodiments of this invention (See FIGS. 7a, b and c).

Figure 10:
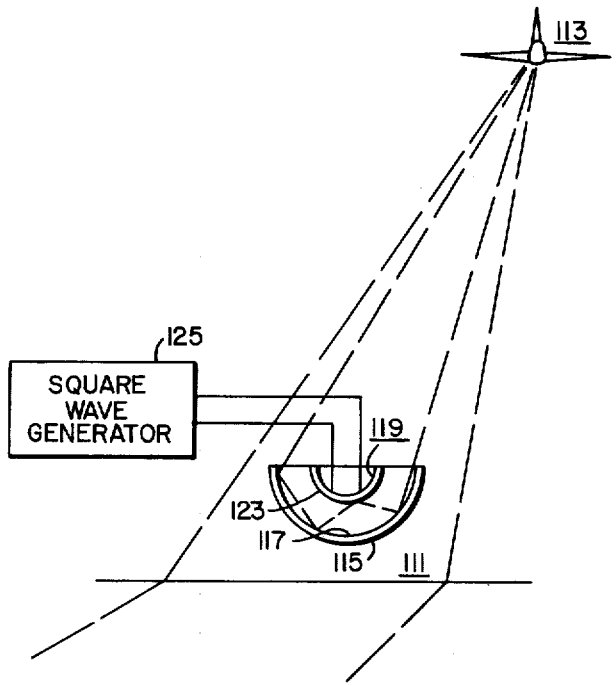
FIG. 10 is a diagrammatic view showing a modification of this invention particularly suitable for signalling to a station at a high elevation or at the zenith.

The apparatus shown in FIG. 10 includes a stationary passive beacon 111 for transmitting signals simulating those from a moving body to an aircraft 113 at a high elevation or at the zenith, the aircraft having an MTI radar (not shown). The beacon 111 includes an outer open half of a helisphere shell 115 having an inner grating 117 of conductors spaced less than one-half wavelength of radiation transmitted by the radar of the aircraft 113. The beacon also includes an inner open hemisphere shell 119 of half the diameter of the shell 115 composed of dielectric material permeable to the radiation. The shell 119 has a grating of windings spaced by less than one-half wavelength of the radiation along the surface of the shell 119. Diodes (not shown) are interposed on the parts 123 of the windings along the outer surface of the shell 119 at spacings of less than one-half the wavelength of the radiation. The diodes (not shown) are rendered alternately conducting and non-conducting by potential from a square-wave generator 125. The parts 125 of the windings along the inner surface of the shell 119 are spaced from the windings 123 along the inner surface by about one-fourth wavelength.

Radiation from the aircraft 113 is focussed by the outer helisphere 111 on the parts 123 and 125 of the windings of the inner shell 119. The reflections from these windings returned to the radar on the craft 113 simulates that from a target moving at a high speed.

Figure 11:
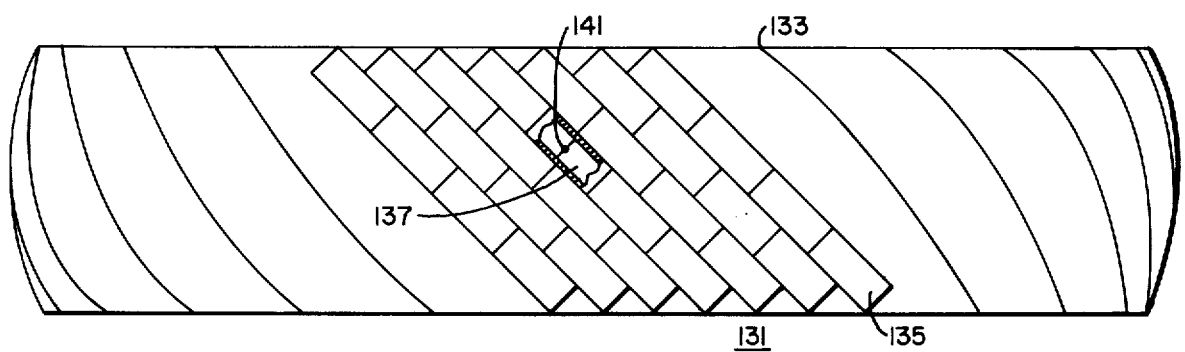
FIG. 11 is a view in side elevation showing another modification of this invention.

FIG. 11 shows a reflector 131 in accordance with this invention. This reflector 131 includes a shell 133 in the form of a section of a sphere. Along the outer surface of the sphere there are a plurality of rows 135 of waveguides 137. The rows 135 are at an angle of about 45° to the diametral plane of the shell 133 which in use is the plane of omnidirectional coverage. Each waveguide 137 has a length equal to about one-half wavelength of the radiation to be reflected, a width equal to about one-fourth of the wavelength of this radiation and a depth equal to about one-quarter of the wavelength of the radiation. A diode 141 shunts the outer rim of each waveguide. The diodes 141 are rendered conducting and non-conducting by a square-wave potential as shown in FIG. 7a. During the intervals when the diodes are conducting radiation is reflected from the outer rim of the waveguides 137; during the intervening intervals the radiation passes into the waveguides 137 and is reflected from the inner surface. A moving target may thus be simulated.

While preferred embodiments of this invention have been disclosed herein, many modifications thereof are feasible. This invention is not to be restricted except insofar as is necessitated by the spirit of the prior art.

What I claim is:

1. A reflector for electromagnetic radiation including an array of conductors of said radiation spaced along a surface by a distance less than one-half wavelength of said radiation, diodes interposed in said conductors at intervals less than one-half wavelength of said radiation, means connected to said diodes for rendering said diodes alternately conducting and non-conducting, said conductors directly reflecting said radiation when said diodes are conducting and transmitting said radiation when said diodes are non-conducting, and means for reflecting the transmitted radiation, said directly reflected radiation and said reflected transmitted radiation being projected in a common beam in which said reflected transmitted radiation and said directly reflected radiation are displaced in phase with reference to each other.

2. The reflector of claim 1 wherein the means for reflecting is displaced from the conductors a distance of about one-fourth wavelength of the radiation so that the phase displacement is about one-half wavelength of said radiation.

3. The apparatus of claim 1 including a dielectric body in the form of a shell of a dielectric material permeable to said radiation of generally spherical contour and having an axis generally perpendicular to the direction of the radiation said axis being perpendicular to a diametral plane through said shell, an electrical conductor wound spirally about said shell with a first portion of each turn along the outer surface of said shell at an angle of about 45° to said plane and a second return portion of each turn along the inner surface of said shell, the diodes being interposed in the first portion of each turn and being connected in series in the conductor.

4. The apparatus of claim 3 including means connected to the conductor for rendering the diodes alternately conducting and non-conducting.

5. The apparatus of claim 4 wherein the means connected to the conductor for rendering the diodes alternately conducting and non-conducting is a substantially square-wave generator for impressing a periodic square-wave potential on the conductor, the diodes being conducting during a portion of the period of said potential and being non-conducting during another portion of the period of said potential.

6. The apparatus of claim 5 wherein the radiation is in the form of periodic pulses of short duration compared to the period between pulses, the periodicity of said pulses being different by a small magnitude from the period of the periodic potential.

7. Signalling apparatus including an MTI radar for transmitting electromagnetic radiation and receiving and processing the resulting electromagnetic radiation reflected by targets, a helisphere reflector including a generally spherical body of dielectric material disposed with its diametral plane generally parallel to the transmitted radiation, electrical conductors along the outer surface of said body generally at about 45° to said diametral plane and spaced less than one-half wavelength of said radiation, a second generally spherical body of dielectric material within said helisphere reflects with its diametral plane generally parallel to the diametral plane of the helisphere reflector and having a diameter such that radiation converged inwardly by said helisphere reflector is focussed on the surface of said second body electrical conductors on the surface said second body generally parallel to the conductors on said helisphere reflectors and spaced less than a half wavelength of said radiation, means connected to the conductors on said second body for rendering said last-named conductors directly reflective of said radiation during first intervals and non-reflective of said radiation during intervening intervals, said body transmitting said radiation during said intervening intervals, and means within said body for reflecting the radiation transmitted during said intervening intervals in a common beam with said radiation reflected during said first intervals, whereby said radar receives and processes a signal having the appearance of being reflected from a moving target.

8. Signalling apparatus including an MTI radar having means for transmitting a beam of electromagnetic radiation and means for receiving and processing the resulting radiation reflected from a target, a reflector for the transmitted radiation including a body of dielectric material, permeable to said radiation, having generally spherical form and having a diametral plane, said body being disposed with said plane generally parallel to said beam, electrical conductors on said body spaced less than one-half wavelength along said body, means for rendering said conductors electrically conducting during predetermined first intervals and electrically non-conducting during intervening second intervals, means focussing said transmitted radiation on certain of said conductors, said focussed radiation being reflected from said certain conductors, during said first intervals and being transmitted through said body during said second intervals, and means spaced from said conductors for reflecting the radiation transmitted through said body in a common reflected beam with the radiation reflected by said certain conductors, said common beam being directed to the receiving means of said radar.

9. The apparatus of claim 8 wherein the focussing means is a helisphere reflector in whose focal surface the conductors are disposed.

10. The apparatus of claim 8 wherein the focussing means is a Luneburg sphere adjacent whose surface the conductors are disposed.

11. The apparatus of claim 8 wherein the spaced reflecting means is spaced about one-fourth wavelength of the radiation from the conductors.

12. The apparatus of claim 8 wherein the means for rendering the conductors electrically conducting and non-conducting includes diodes interposed along said conductors at distances less than one-half wavelength of the radiation and said means also includes switching means for alternating switching said diodes between conducting and non-conducting conditions.

13. The apparatus of claim 8 wherein each conductor is an array of waveguides, the cross-sectional length of each waveguide being equal to about one-half the wavelength of the radiation and the depth of each waveguide being equal to about one-fourth the wavelength of the radiation, each waveguide being shunted at its outer rim by a diode which is switched on and off respectively during the first and second intervals.

14. Signalling apparatus for communicating with an overhead MTI radar having means for transmitting a beam of electromagnetic radiation and receiving means for receiving and processing the resulting radiation reflected from a target, the said apparatus including a bowl-shaped body of dielectric material having a focal surface therein disposed to receive the said transmitted radiation, said body as so disposed extending about a vertical plane, first electrical conductors spaced along said body at an angle of about 45° to said plane, the spacing between said conductors being less than one-half wavelength of said radiation, a second body of dielectric material having a surface generally the same as said focal surface of said first body, said second body being disposed with its said surface generally coincident with the said focal surface of said first body, second electrical conductors spaced along said surface of said second body generally parallel to the said first electrical conductors spaced along said first body, the spacing between said second conductors being less than one-half wavelength of said radiation, means for rendering said second conductors alternately reflective and not reflective to said radiation, whereby said radiation is alternately reflected from and transmitted by said second body, and radiation reflecting means spaced from said second conductors for reflecting the radiation transmitted by said second body.

15. The apparatus of claim 13 wherein the first and second bodies are in the form of generally hemispherical shells, the second conductors being spaced along a region of said second body of about half the diameter of the region of said first body along which the first conductors are spaced.

16. The apparatus of claim 13 wherein the radiation reflecting means is spaced about one-quarter wavelength of the radiation from the second conductors on the direction away from the first body.

17. A beacon for use with an MTI radar having means for transmitting electromagnetic radiation and receiving means for receiving and processing resulting radiation reflected from targets, said beacon including a generally spherical body of dielectric material having a plurality of conductors thereon, said conductors being spaced by less than a half wavelength of said radiation and being at an angle of 45° to the plane of omnidirectional coverage of said body, diodes interposed in said conductors at distances less than one-half wavelength of said radiation, means for focussing radiation on certain of said conductors, means connected to said conductors for rendering said diodes alternately conducting and non-conducting, and means for reflecting the focussed radiation transmitted through said body during the intervals when said diodes are non-conducting.

* * * * *